United States Patent
Migita et al.

(10) Patent No.: US 9,048,716 B2
(45) Date of Patent: Jun. 2, 2015

(54) MOTOR INCLUDING SPECIFIC MAGNETIC SENSOR ARRANGEMENT

(75) Inventors: Takayuki Migita, Kyoto (JP); Shunsuke Murakami, Kyoto (JP)

(73) Assignee: Nidec Corporation, Kyoto (JP)

( * ) Notice: Subject to any disclaimer, the term of this patent is extended or adjusted under 35 U.S.C. 154(b) by 246 days.

(21) Appl. No.: 13/547,093

(22) Filed: Jul. 12, 2012

(65) Prior Publication Data
US 2013/0026888 A1 Jan. 31, 2013

(30) Foreign Application Priority Data
Jul. 28, 2011 (JP) .................................. 2011-165801

(51) Int. Cl.
*H02K 11/00* (2006.01)
*H02K 29/08* (2006.01)

(52) U.S. Cl.
CPC .............. *H02K 29/08* (2013.01); *H02K 11/001* (2013.01); *H02K 11/0021* (2013.01); *H02K 11/0015* (2013.01)

(58) Field of Classification Search
CPC ............ H02K 11/001; H02K 11/0015; H02K 11/0021
USPC .......................................... 310/89, 68 B, 91
See application file for complete search history.

(56) References Cited

U.S. PATENT DOCUMENTS

| | | | |
|---|---|---|---|
| 4,857,784 A * | 8/1989 | Mukaekubo ................ 310/68 B |
| 5,532,533 A * | 7/1996 | Mizutani ..................... 310/68 B |
| 5,864,188 A * | 1/1999 | Gerrand et al. ................. 310/71 |
| 7,518,273 B2 * | 4/2009 | Kataoka et al. ............ 310/68 B |
| 2007/0290568 A1* | 12/2007 | Ihle et al. ...................... 310/257 |
| 2008/0012443 A1* | 1/2008 | Tamaoka et al. .............. 310/179 |
| 2008/0211356 A1* | 9/2008 | Kataoka et al. ............ 310/68 B |
| 2008/0211357 A1 | 9/2008 | Kataoka et al. |
| 2009/0230811 A1* | 9/2009 | Asano .................... 310/216.001 |

FOREIGN PATENT DOCUMENTS

JP 2008-219996 A 9/2008

* cited by examiner

*Primary Examiner* — John K Kim
*Assistant Examiner* — Robert E Mates
(74) *Attorney, Agent, or Firm* — Keating & Bennett, LLP

(57) ABSTRACT

In a motor, a magnetic sensor is provided on the lower surface of a substrate disposed above a magnetic sensor. On an upper surface of the substrate, a plate-shaped magnetic member is disposed at a position axially overlapping the magnetic sensor. The substrate and the magnetic member are fixed to each other at a plurality of fixing positions by axial tightening. On the upper surface of the magnetic member, a rib extending to connect the vicinity of one fixing position and the vicinity of another fixing position is provided. Flexure of the magnetic member is significantly reduced and prevented by this rib. For this reason, the direction of the magnetic flux of a magnet is concentrated on the magnetic sensor side. As a result, detection accuracy of the magnetic sensor is significantly improved.

10 Claims, 7 Drawing Sheets

MOTOR INCLUDING SPECIFIC MAGNETIC SENSOR ARRANGEMENT

BACKGROUND OF THE INVENTION

1. Field of the Invention

The present invention relates to a motor.

2. Description of the Related Art

In the past, a technique has been known in which a sensor magnet is mounted on a rotating section of a motor and then the position of the sensor magnet is magnetically detected. In this way, the rotational position or the number of rotations of the rotating section of the motor can be detected. For example, in Japanese Unexamined Patent Application Publication No. 2008-219996, a motor including a sensor magnet and a Hall element is described. The sensor magnet is fixed to a shaft through a yoke. The Hall element faces the sensor magnet. In the motor described in the above publication, the magnetic pole of the sensor magnet is detected by the Hall element. In this way, an angular position around a central axis of a rotor core with respect to an armature is detected.

In the motor described in Japanese Unexamined Patent Application Publication No. 2008-219996, the Hall element is disposed on the lower surface of a circuit board above the sensor magnet. Further, a back yoke, which is a magnetic body, is fixed to the upper surface of the circuit board. Then, magnetic flux density toward the Hall element from the sensor magnet is increased by the back yoke. In this way, detection accuracy of a sensor is improved (refer to Paragraph [0059] of Japanese Unexamined Patent Application Publication No. 2008-219996).

However, if such a back yoke is fixed to the circuit board by a plurality of screws, there are cases where the back yoke will be bent by the tightening force of the screws. If the back yoke is bent, an undesirable clearance will be produced between the upper surface of the circuit board and the lower surface of the back yoke. This clearance makes it difficult to sufficiently improve the detection accuracy of the sensor.

In addition, a lowering of an amount of detection accuracy caused by the flexure of such a magnetic member can be within an acceptable range depending on the application of the motor. However, in order to provide a higher quality motor, it is required to improve detection accuracy of a magnetic sensor by suppressing the flexure of the magnetic member.

SUMMARY OF THE INVENTION

A motor according to a first preferred embodiment of the present invention includes a stationary section and a rotating section. The rotating section rotates around a central axis extending up and down, with respect to the stationary section. The rotating section preferably includes a rotor magnet and a sensor magnet. The rotor magnet is arranged to generate a torque between itself and an armature provided on the stationary section side. Further, the sensor magnet is preferably provided separately from the rotor magnet and the magnetic pole surface of the sensor magnet faces in an axial direction. The stationary section preferably includes a housing, a substrate, a magnetic sensor, and a magnetic member. The housing accommodates the rotating section and the armature internally in a radial direction. Further, the substrate is disposed above the sensor magnet. Further, the magnetic sensor is preferably provided on the lower surface of the substrate and detects the magnetic flux of the sensor magnet. Further, the magnetic member is preferably disposed at a position axially overlapping the magnetic sensor on the upper surface of the substrate. The substrate and the magnetic member are fixed to each other preferably at a plurality of fixing positions by, for example, axial tightening. The substrate is preferably fixed to a surface perpendicular or substantially perpendicular to the axial direction of the housing. Further, on the upper surface of the magnetic member, a rib extending so as to connect the vicinity of one fixing position and the vicinity of another fixing position is provided. In the lower surface of the magnetic member, a concave portion is provided at a position corresponding to the rib. The magnetic sensor and the concave portion are preferably disposed at positions which do not overlap each other in the axial direction.

According to the first preferred embodiment of the present invention, flexure of the magnetic member is preferably reduced and prevented by the rib provided on the upper surface of the magnetic member. Further, the concave portion provided in the lower surface of the magnetic member is preferably disposed at a position which does not axially overlap the magnetic sensor. For this reason, the direction of the magnetic flux of a magnet is further concentrated on the magnetic sensor side. As a result, detection accuracy of the magnetic sensor is significantly improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings. In addition, in the following, the shape or the positional relationship of each section will be described with a direction following the central axis of the motor set to be the up-and-down direction and the substrate side set to be the top with respect to the sensor magnet. However, this is for defining the up-and-down direction only for the convenience of explanation and is not intended to limit the direction of a motor in use according to preferred embodiments of the present invention.

Figure 1:
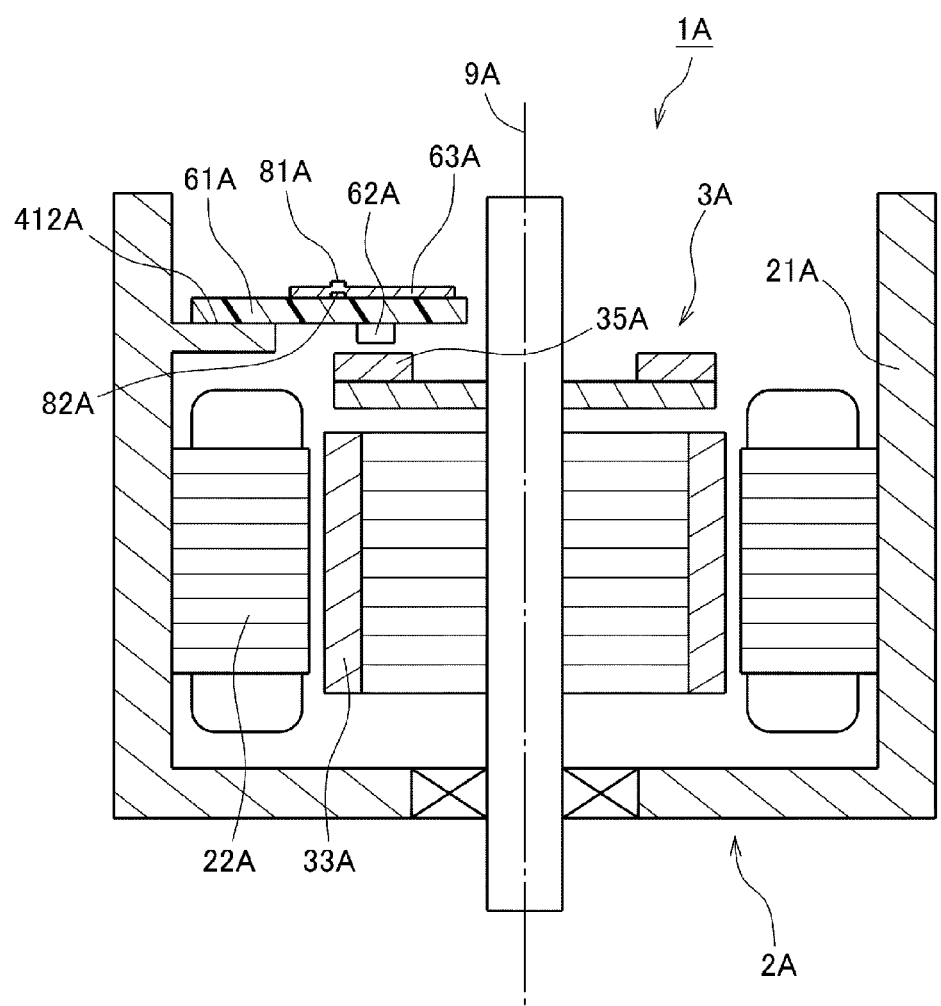
FIG. 1 is a vertical cross-sectional view of a motor in accordance with a preferred embodiment of the present invention.

FIG. 1 is a partial cross-sectional view of a motor 1A related to a preferred embodiment of the present invention. The motor 1A preferably includes a stationary section 2A and a rotating section 3A. The rotating section 3A is arranged to rotate around a central axis 9A with respect to the stationary section 2A.

The rotating section 3A preferably includes a rotor magnet 33A and a sensor magnet 35A provided separately from the rotor magnet 33A. The rotor magnet 33A is arranged to generate torque between itself and an armature 22A provided on the stationary section 2A side. The magnetic pole surface of the sensor magnet 35A faces in an axial direction (a direction following the central axis, hereinafter the same).

The stationary section 2A preferably includes a housing 21A, the armature 22A, a substrate 61A, a magnetic sensor 62A, and a plate-shaped magnetic member 63A. The rotating section 3A and the armature 22A are preferably accommodated internally in a radial direction (a direction orthogonal to the central axis, hereinafter the same) in the housing 21A. Further, the housing 21A preferably includes a mounting surface 412A that is perpendicular or substantially perpendicular to the axial direction. The substrate 61A is preferably directly fixed to the mounting surface 412A. In addition, the substrate 61A may also be indirectly fixed to the mounting surface 412A of the housing 21A through any other desirable member.

The substrate 61A is disposed above the sensor magnet 35A. The magnetic sensor 62A is provided on the lower surface of the substrate 61A and detects the magnitude of the magnetic flux of the sensor magnet 35A. The magnetic member 63A is preferably disposed at a position axially overlapping the magnetic sensor 62A on the upper surface of the substrate 61A. The direction of the magnetic flux of the sensor magnet 35A is concentrated on the upper side due to the magnetic member 63A.

The magnetic member 63A is preferably fixed to a surface perpendicular or substantially perpendicular to the axial direction of the housing through the substrate 61A at a plurality of fixing positions by, for example, screw fixing. The substrate 61A and the magnetic member 63A are tightened to each other in the axial direction by the screw fixing, for example. Further, in the motor 1A, a rib 81A is preferably provided on the upper surface of the magnetic member 63A. The rib 81A extends so as to connect a vicinity of one fixing position and a vicinity of another fixing position. In this way, flexure of the magnetic member 63A due to axial tightening which is imparted to the substrate 61A and the magnetic member 63A is significantly reduced and prevented. For this reason, the direction of the magnetic flux of the sensor magnet 35A is further concentrated on the magnetic sensor 62A side. As a result, detection accuracy of the magnetic sensor 62A is significantly improved.

In addition, in the lower surface of the magnetic member 63A, a concave portion 82A is preferably provided at a position corresponding to the rib 81A. However, the magnetic sensor 62A and the concave portion 82A are disposed at positions which do not overlap each other in the axial direction. For this reason, lowering of the detection accuracy due to the influence of the concave portion 82A is significantly reduced and prevented.

Subsequently, a more specific preferred embodiment of the present invention will be described.

A motor 1 related to this more specific preferred embodiment of the present invention is mounted on an automobile and preferably used, for example, to generate the driving force of a power steering system. However, a motor according to preferred embodiments of the present invention may also be used in other known applications. For example, the motor according to preferred embodiments of the present invention may also be used as a drive source for another component of an automobile such as, for example, a fan arranged to cool an engine. Further, the motor according to preferred embodiments of the present invention may also be mounted on home electric appliances, office automation equipment, medical equipment, or the like, thereby generating various driving forces, for example.

Figure 2:
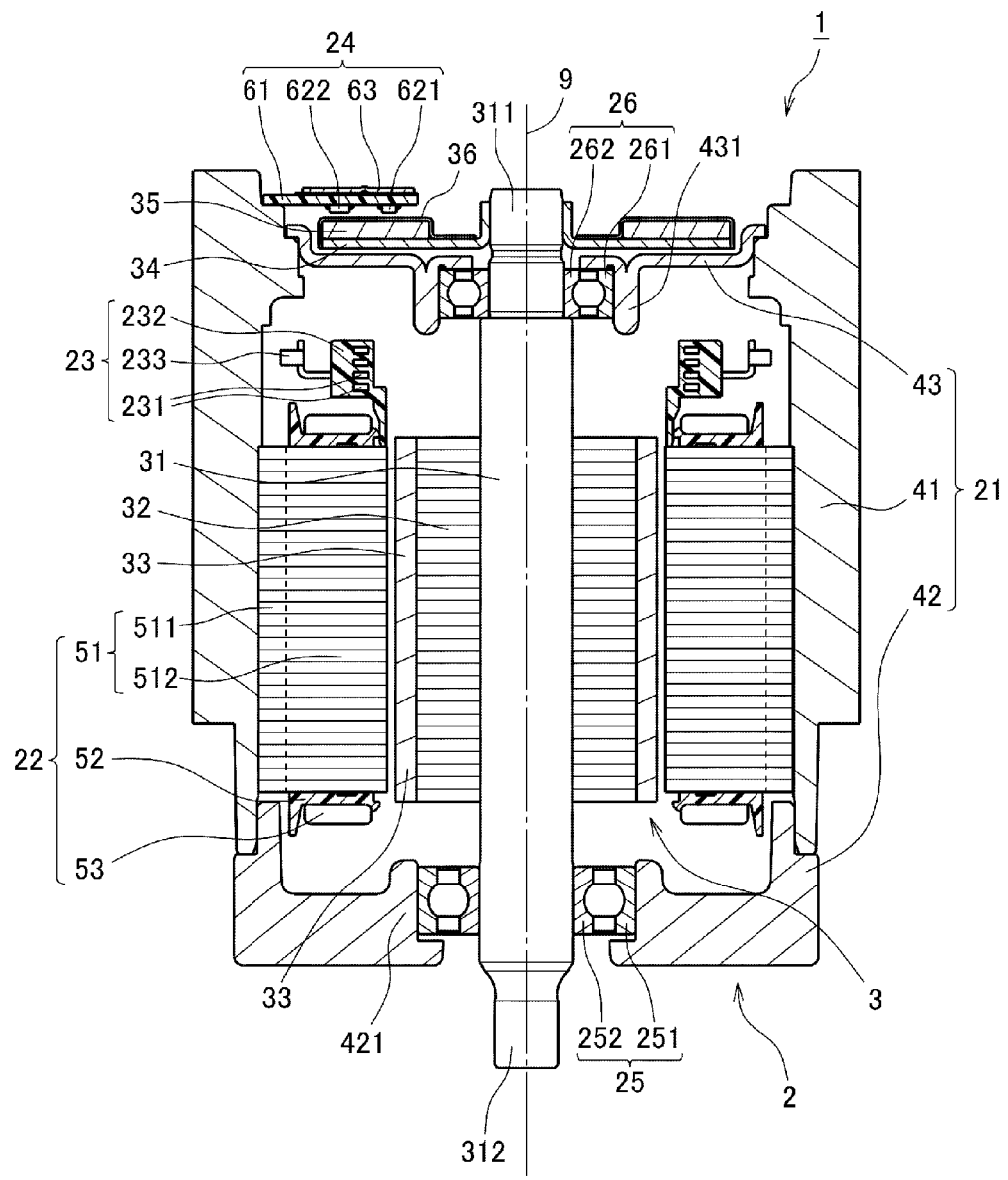
FIG. 2 is a vertical cross-sectional view of a motor in accordance with a preferred embodiment of the present invention.

FIG. 2 is a vertical cross-sectional view of the motor 1 related to the present preferred embodiment. As shown in FIG. 2, the motor 1 includes a stationary section 2 and a rotating section 3. The stationary section 2 is preferably fixed to a frame body of an automobile. The rotating section 3 is supported so as to be able to rotate with respect to the stationary section 2.

The stationary section 2 in this preferred embodiment preferably includes a housing 21, an armature 22, a bus bar unit 23, a sensor unit 24, a lower bearing section 25, and an upper bearing section 26.

The housing 21 preferably includes a cylindrical member 41, a bottom member 42, and a cover member 43. The cylindrical member 41 is a preferably substantially cylindrical member axially extending radially outside the armature 22. The armature 22, the bus bar unit 23, a rotor core 32 (described later), and a plurality of rotor magnets 33 (described later) are all preferably accommodated internally in the radial direction of the cylindrical member 41.

The bottom member 42 is arranged to extend out radially below the armature 22. An outer peripheral portion of the bottom member 42 is preferably fixed to a lower portion of the cylindrical member 41. At the center of the bottom member 42, a lower annular retention portion 421 arranged to retain the lower bearing section 25 is preferably provided. The cover member 43 is arranged to extend radially out above the armature 22 and the bus bar unit 23. An outer peripheral portion of the cover member 43 is fixed to the cylindrical member 41. At the center of the cover member 43, an upper annular retention portion 431 arranged to retain the upper bearing section 26 is provided. Further, the housing 21 has an opening on the upper side and the opening is preferably blocked by the cover member.

The armature 22 preferably includes a stator core 51, an insulator 52, and a coil 53. The stator core 51 is preferably defined by, for example, laminated steel plates in which a plurality of electromagnetic steel plates is laminated in the axial direction. However, any other desirable type of stator could be used instead. The stator core 51 preferably includes a core back 511 and teeth 512. The core back 511 is annular. The teeth preferably protrude toward the radial inside from the core back 511. The core back 511 is fixed to the inner circumferential surface of the cylindrical member 41 of the housing 21. The plurality of teeth 512 is arranged at substantially regular intervals in a circumferential direction.

The insulator 52 is preferably made of, for example, resin which is an insulating body. Then, the insulator 52 is mounted on the teeth 512. The coil 53 is preferably made of an electrically conducting wire wound around the insulator 52. The insulator 52 is interposed between the teeth 512 and the coil 53, thereby preventing electrical short-circuit of the teeth 512 and the coil 53.

The bus bar unit 23 is preferably mounted on an upper portion of the armature 22. The bus bar unit 23 is a mechanism arranged to electrically connect an external power supply to the coil 53. The bus bar unit 23 preferably includes four bus bars 231 and a bus bar holder 232. The four bus bars 231 preferably are arc-shaped conductive bodies. The bus bar holder 232 holds the four bus bars 231 and is preferably made of resin. The four bus bars 231 respectively correspond to the U phase, the V phase, and the W phase of a three-phase alternating current, and a ground wire. Further, the four bus bars 231 are preferably held by the bus bar holder 232 to be maintained in a state of being spaced apart from each other.

The four bus bars 231 include a plurality of terminals 233. The plurality of terminals 233 preferably protrudes toward the outside in the radial direction from the outer circumferential surface of the bus bar holder 232. An end portion of the conducting wire defining each coil 53 is connected to the terminal 233 of the corresponding bus bar 231.

The sensor unit 24 is a mechanism which detects the magnitude of the magnetic flux of a sensor magnet 35 (described later). The sensor unit 24 preferably includes a circuit board 61, a first Hall element 621, a second Hall element 622, and a magnetic member 63. The circuit board 61 is disposed above the sensor magnet 35. The first Hall element 621 and the second Hall element 622 are preferably magnetic sensors which detect the magnitude of the magnetic flux of the sensor magnet 35. A more detailed configuration of the sensor unit 24 will be described later.

The lower bearing section 25 and the upper bearing section 26 are mechanisms which rotatably support a shaft 31 on the rotating section 3 side. In each of the lower bearing section 25 and the upper bearing section 26 in this preferred embodiment, a ball bearing in which an outer race and an inner race are relatively rotated through spherical bodies is preferably used. However, in place of the ball bearing, another type of bearing such as, for example, a plain bearing, a fluid bearing, etc. may also be used.

An outer race 251 of the lower bearing section 25 is preferably fixed to the lower annular retention portion 421 of the bottom member 42. Further, an outer race 261 of the upper bearing section 26 is preferably fixed to the upper annular retention portion 431 of the cover section 43. On the other hand, inner races 252 and 262 of the lower bearing section 25 and the upper bearing section 26 are preferably fixed to the shaft 31. For this reason, the shaft 31 is supported so as to be able to rotate with respect to the housing 21.

The rotating section 3 in this preferred embodiment includes the shaft 31, the rotor core 32, the plurality of rotor magnets 33, a yoke 34, the sensor magnet 35, and a magnet cover 36.

The shaft 31 is preferably a member extending up and down along a central axis 9. The shaft 31 rotates around the central axis 9 while being supported on the lower bearing section 25 and the upper bearing section 26 described above. The shaft 31 preferably includes a head portion 311 protruding further upward than the cover section 43 of the housing 21. An inner peripheral portion of the yoke 34 is fixed to the head portion 311. Further, the shaft 31 preferably includes a leg portion 312 protruding further downward than the bottom member 42 of the housing 21. The leg portion 312 is preferably connected to, for example, the steering gear of an automobile through a power transmission mechanism such as gears.

The rotor core 32 and the plurality of rotor magnets 33 are disposed radially inside the armature 22. Further, the rotor core 32 and the plurality of rotor magnets 33 rotate along with the shaft 31. The rotor core 32 is a member fixed to the shaft 31. The rotor core 32 preferably includes, for example, laminated steel plates in which a plurality of electromagnetic steel plates is laminated in the axial direction. However, any other desirable type of rotor core could be used instead. The plurality of rotor magnets 33 is preferably fixed to the outer circumferential surface of the rotor core 32 by, for example, an adhesive. The surface on the outside in the radial direction of each rotor magnet 33 is a magnetic pole surface which faces the end surface on the inside in the radial direction of each of the teeth 512. The plurality of rotor magnets 33 is preferably arranged at regular intervals in a circumferential direction such that the magnetic pole surface having the north pole and the magnetic pole surface having the south pole are alternately arranged.

In addition, in place of the plurality of rotor magnets 33, a single annular rotor magnet in which the north pole and the south pole are alternately magnetized in the circumferential direction may also be used if so desired.

If a driving current is provided from an external power supply to the coil 53 through the bus bars 231, a radial magnetic flux is generated in the plurality of teeth 512 of the stator core 51. Then, circumferential torque is generated by the action of the magnetic flux between the teeth 512 and the rotor magnets 33. As a result, the rotating section 3 rotates around the central axis 9 with respect to the stationary section 2.

Figure 3:
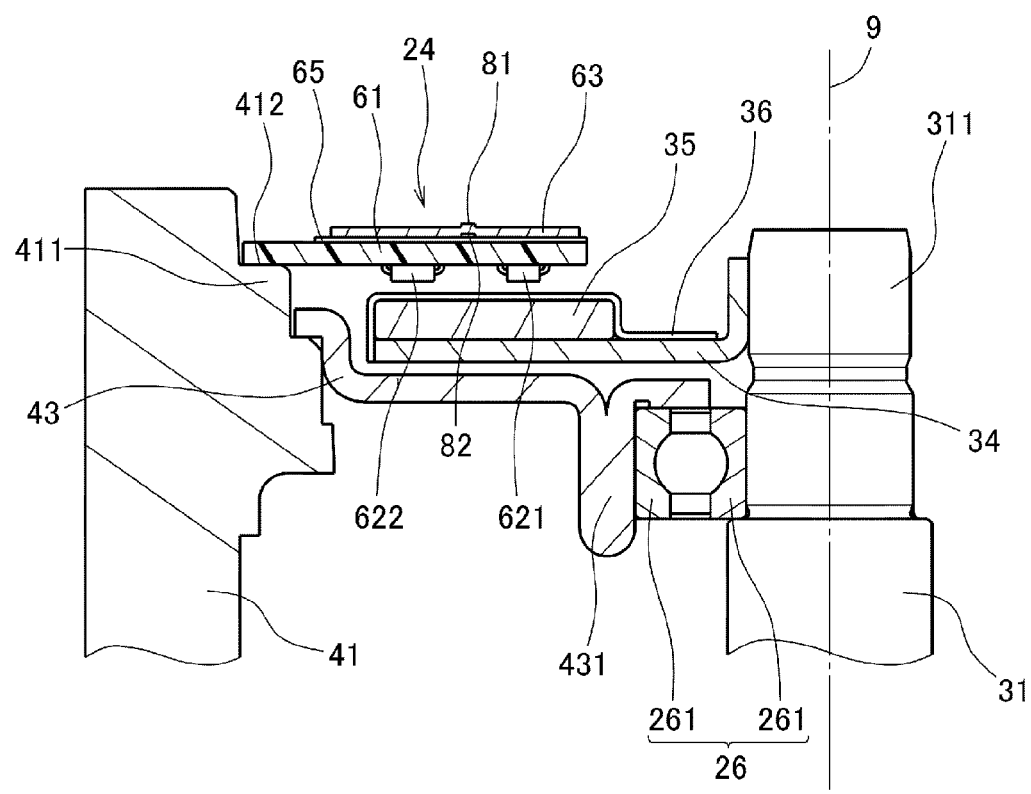
FIG. 3 is a partial vertical cross-sectional view of the motor in accordance with a preferred embodiment of the present invention.
Figure 4:
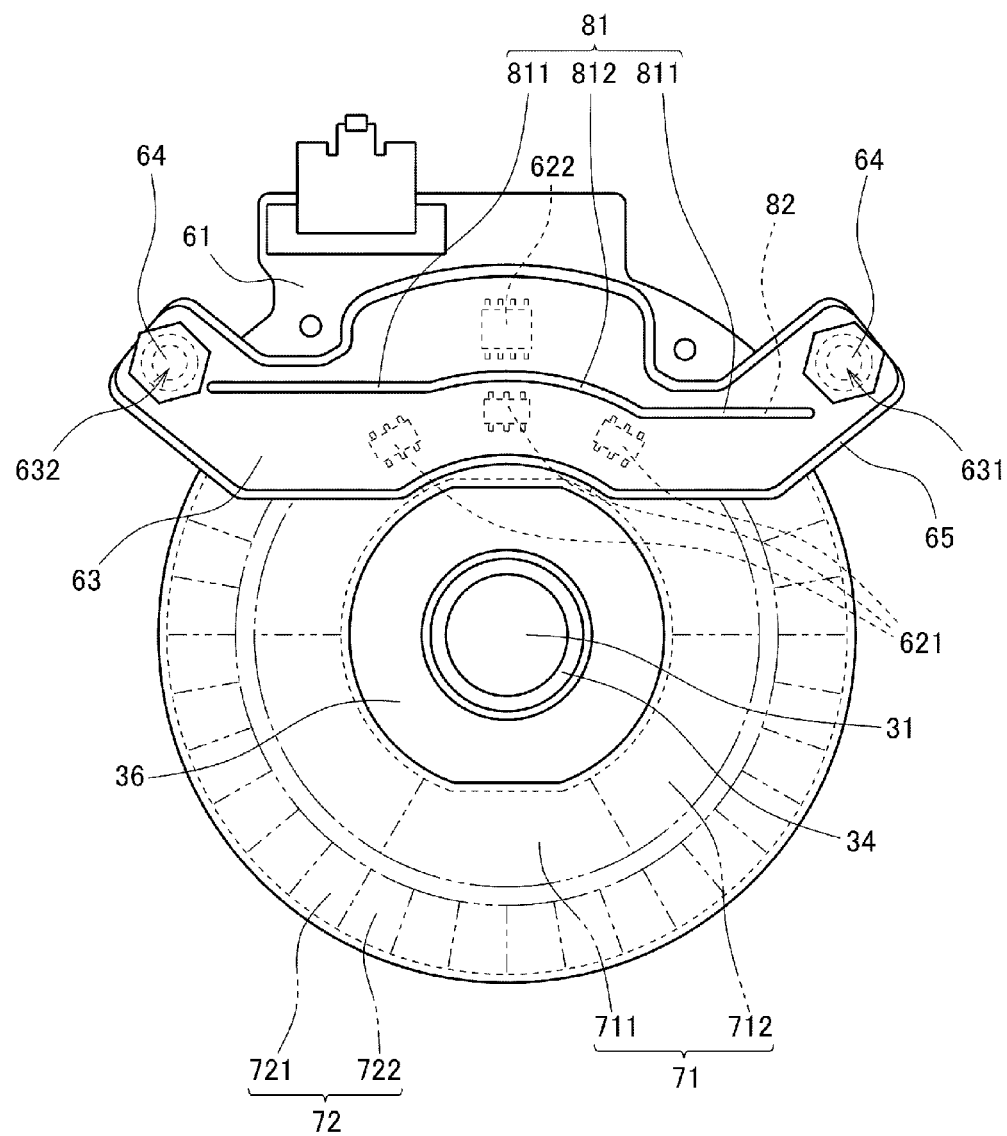
FIG. 4 is a partial top view of the motor in accordance with a preferred embodiment of the present invention.

FIG. 3 is a partial vertical cross-sectional view of the motor 1 in the vicinity of the sensor unit 24 and the sensor magnet 35. FIG. 4 is a partial top view of the motor 1 in the vicinity of the sensor unit 24 and the sensor magnet 35. In the following, a structure in the vicinity of the sensor unit 24 and the sensor magnet 35 will be described with reference to FIGS. 3 and 4.

As shown in FIG. 3, the sensor magnet 35 is preferably fixed to the upper surface of the yoke 34. The yoke 34 is preferably made of a magnetic body and is arranged to extend radially above the cover member 43 of the housing 21. An inner peripheral portion of the yoke 34 is fixed to the head portion 311 of the shaft 31. The sensor magnet 35 is preferably an approximately annular magnet. The upper surface of the sensor magnet 35 is a magnetic pole surface which faces the first Hall element 621 and the second Hall element 622. That is, the magnetic pole surface of the sensor magnet 35 faces in the axial direction.

The magnet cover 36 is preferably disposed on the upper surface side of the sensor magnet 35. The magnet cover 36 is preferably made of metal that is a non-magnetic body such as aluminum, for example. The surface of the sensor magnet 35 is surrounded by the yoke 34 and the magnet cover 36. For this reason, even if damage occurs in the sensor magnet 35, scattering of fragments of the sensor magnet 35 to the outside is prevented.

As shown by a two-dot chain line in FIG. 4, on the upper surface of the sensor magnet 35, an inner magnetic pole section 71 and an outer magnetic pole section 72 are provided. The inner magnetic pole section 71 is preferably annular. Further, the outer magnetic pole section 72 is preferably annular and is located further radially outside than the inner magnetic pole section 71. In the inner magnetic pole section 71, a north pole 711 and a south pole 712 are preferably alternately magnetized in the circumferential direction. In the outer magnetic pole section 72, a north pole 721 and a south pole 722 are preferably alternately magnetized in the circumferential direction at smaller pitch than in the inner magnetic pole section 71.

The cylindrical member 41 of the housing 21 preferably includes a convex mounting portion 411 which protrudes radially inside further on the upper side than the cover member 43. An upper surface 412 of the convex mounting portion 411 extends in a direction perpendicular or approximately perpendicular to the axial direction. Then, the circuit board 61 is fixed to the upper surface 412 of the convex mounting portion 411. In addition, the circuit board 61 may also be directly fixed to the upper surface 412 of the convex mounting portion 411, as in FIG. 3, and may also be indirectly fixed to the upper surface 412 of the convex mounting portion 411 through another member if so desired.

On the lower surface of the circuit board 61, three first Hall elements 621 and a single second Hall element 622 are preferably provided. The single second Hall element 622 is disposed further radially outside than the first Hall elements 621. The three first Hall elements 621 are disposed above the inner magnetic pole section 71 of the sensor magnet 35. Each of the first Hall elements 621 detects the magnitude of the magnetic flux of the inner magnetic pole section 71. The second Hall element 622 is disposed above the outer magnetic pole section 72 of the sensor magnet 35. The second Hall element 622 detects the magnitude of the magnetic flux of the outer magnetic pole section 72. Then, a detection circuit connected to the first Hall elements 621 and the second Hall element 622 detects the rotational position or the number of rotations of the rotating section 3 on the basis of detection signals from the first Hall elements 621 and the second Hall element 622.

The first Hall elements 621 and the second Hall element 622 detect the magnitude of the magnetic flux of the sensor magnet 35, rather than detecting the magnitude of the magnetic flux of the rotor magnets 33. The sensor magnet 35 is provided separately from the rotor magnets 33 and the magnetic pole surface thereof faces in the axial direction. For this reason, compared to the case where the first Hall elements 621 and the second Hall element 622 detect the magnitude of the magnetic flux of the rotor magnets 33, the above-mentioned detection circuit can accurately detect the rotational position or the number of rotations of the rotating section 3.

Further, in this preferred embodiment, the inner magnetic pole section 71 and the outer magnetic pole section 72 are preferably respectively detected by two types of Hall elements 621 and 622. Further, in the inner magnetic pole section 71 and the outer magnetic pole section 72, the circumferential magnetic pole pitches are different from each other. In this way, the rotational position or the number of rotations of the rotating section 3 is detected with higher precision.

The plate-shaped magnetic member 63 is preferably made of an electromagnetic steel plate and is mounted on the upper surface of the circuit board 61 with an insulating sheet 65 interposed therebetween. The magnetic member 63 extends in a direction orthogonal to the central axis 9. As shown in FIG. 4, the magnetic member 63 is fixed to the circuit board 61 at two fixing positions 631 and 632. At each of the fixing positions 631 and 632, the circuit board 61 and the magnetic member 63 are preferably fixed to the upper surface 412 of the convex mounting portion 411 by, for example, a screw 64 that is a fixing member. That is, the magnetic member 63 is preferably interposed and fixed between the circuit board 61 and the fixing member (the screw 64) at each of the two fixing positions 631 and 632. In doing so, the circuit board 61 and the magnetic member 63 are mechanically tightly fixed by an axial tightening force.

In this preferred embodiment, the insulating sheet 65 made of resin is interposed between the circuit board 61 and the magnetic member 63 at a peripheral portion of each of the two fixing positions 631 and 632. On the upper surface and the lower surface of the circuit board 61, conductive patterns are preferably configured by a conductive body such as, for example, a copper foil. The insulating sheet 65 is disposed in order to insulate the pattern of the circuit board 61 from the magnetic member 63.

The magnetic member 63 is preferably disposed at a position axially overlapping the first Hall elements 621 and the second Hall element 622. For this reason, the direction of the magnetic flux of the sensor magnet 35 is concentrated on the upper side that is the magnetic member 63 side. That is, magnetic flux which is generated from the inner magnetic pole section 71 is concentrated on the first Hall elements 621 side. Further, magnetic flux which is generated from the outer magnetic pole section 72 is concentrated on the second Hall element 622 side. In this way, detection accuracy of the first Hall elements 621 and the second Hall element 622 is increased.

Further, a rib 81 protruding upward is preferably provided on the upper surface of the magnetic member 63. The rib 81 extends so as to connect the vicinity of the fixing position 631 on one side and the vicinity of the fixing position 632 on the other side. For this reason, even if stress occurs in the magnetic member 63 due to the tightening force at each of the fixing positions 631 and 632, flexure of the magnetic member 63 due to the stress will not occur easily. That is, flexure of the magnetic member 63 is significantly reduced and prevented by the rib 81.

If flexure of the magnetic member 63 is significantly reduced and prevented, the direction of the magnetic flux of the sensor magnet 35 is further concentrated on the magnetic member 63 side. That is, the magnetic flux which is generated from the inner magnetic pole section 71 is further concentrated on the first Hall elements 621 side. Further, the magnetic flux which is generated from the outer magnetic pole section 72 is further concentrated on the second Hall element 622 side. As a result, the detection accuracy of the first Hall elements 621 and the second Hall element 622 is further significantly improved.

In the present preferred embodiment, the rib 81 of the magnetic member 63 is preferably formed by, for example, half-blanking. For this reason, in the lower surface of the magnetic member 63, a concave portion 82 caused by the half-blanking is formed. The concave portion 82 is provided at a position corresponding to the rib 81, that is, on the lower side of the rib 81. Then, as shown in FIG. 4, the concave portion 82, the first Hall elements 621, and the second Hall element 622 are disposed at positions which do not overlap each other in the axial direction. Therefore, a flat portion of the lower surface of the magnetic member 63 is located directly above the first Hall elements 621 and the second Hall element 622. If doing so, it is possible to make the magnetic flux of the sensor magnet 35 be further concentrated on the Hall elements 621 and 622 side. Therefore, the detection accuracy of the first Hall elements 621 and the second Hall element 622 is further improved.

As shown in FIG. 4, the rib 81 in this preferred embodiment preferably includes a pair of linear portions 811 and a curved portion 812. The pair of linear portions 811 extends in a linear fashion. Further, the curved portion 812 extends in a curved line between the pair of linear portions 811. The pair of linear portions 811 particularly increases the strength of the magnetic member 63 in the vicinity of both end portions close to the fixing positions 631 and 632. Further, axial overlap of the first Hall elements 621, the second Hall element 622, and the rib 81 is avoided by the curved portion 812.

Further, as shown in FIG. 4, the rib 81 in this preferred embodiment preferably extends passing between the first Hall elements 621 and the second Hall element 622 in a plan view. For this reason, at both the upper position of each of the first Hall elements 621 and the upper position of the second Hall element 622, flexure of the magnetic member 63 is more effectively reduced and prevented.

As described above, in this preferred embodiment, the detection accuracy of the Hall elements 621 and 622 is significantly increased by using the magnetic member 63 including the rib 81. For this reason, by using a magnet having a weak magnetic force, such as, for example, a ferrite magnet, in the sensor magnet 35, it is possible to obtain high detection accuracy while reducing the cost of the sensor magnet 35.

However, the sensor magnet in the invention may also be made of another desirable magnetic material such as, for example, neodymium.

Figure 5:
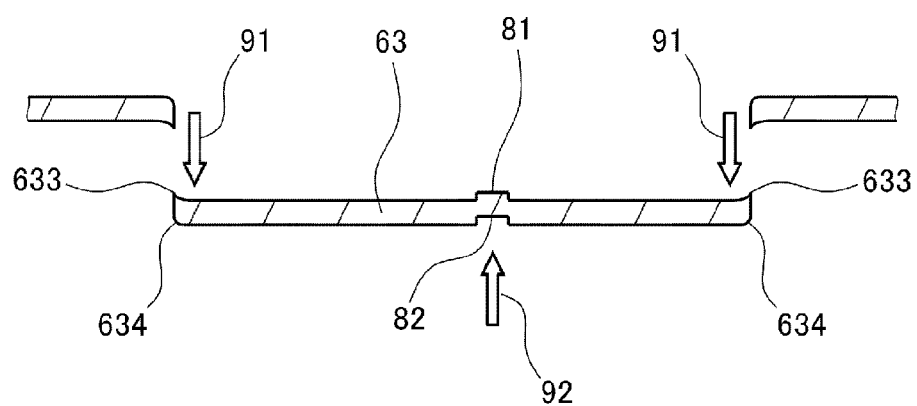
FIG. 5 is a diagram conceptually showing a state that occurs during formation of the magnetic member in accordance with a preferred embodiment of the present invention.

FIG. 5 is a diagram conceptually showing a state that occurs during formation of the magnetic member 63 in accordance with a preferred embodiment of the present invention. The magnetic member 63 in the present preferred embodiment can preferably be obtained by stamping out an electromagnetic steel plate. As shown by a white arrow 91 in FIG. 5, the magnetic member 63 is preferably stamped out downward. For this reason, a protrusion portion 633 caused by the stamping-out is formed at a peripheral portion of the upper surface of the magnetic member 63. Further, a curved surface portion 634 caused by the stamping-out is formed at a peripheral portion of the lower surface of the magnetic member 63. Further, the rib 81 of the magnetic member 63 is preferably formed by, for example, half-blanking. As shown by a white arrow 92 in FIG. 5, the rib 81 in this preferred embodiment is subjected to upward half-blanking.

If doing so, on the lower surface side of the magnetic member 63, neither the rib 81 nor the protrusion portion 633 caused by the stamping-out is formed. For this reason, it is possible to bring the lower surface of the magnetic member 63 into surface contact with the upper surface of the insulating sheet 65. Therefore, the lower surface of the magnetic member 63 can be more precisely positioned. As a result, the magnetic flux of the sensor magnet 35 is preferably further concentrated on the Hall elements 621 and 622 side, so that the detection accuracy of the Hall elements 621 and 622 can be improved.

Exemplary preferred embodiments of the invention have been described above. However, the present invention is not limited to the above-described preferred embodiments.

Figure 6:
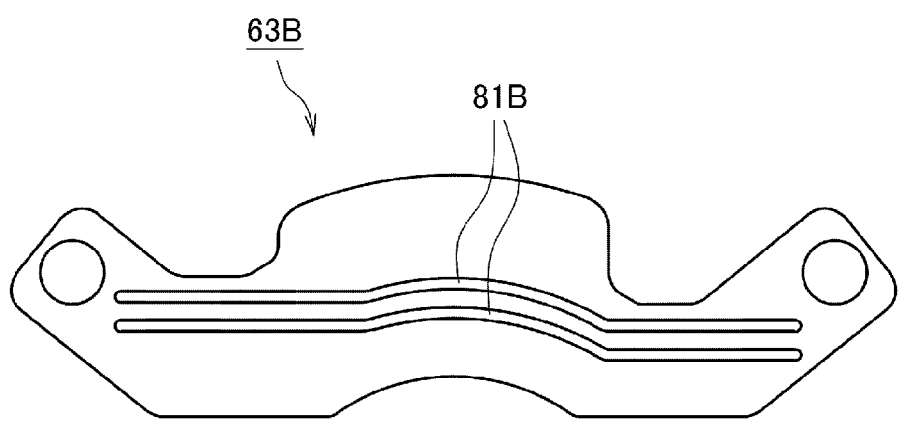
FIG. 6 is a top view of the magnetic member in accordance with a preferred embodiment of the present invention.
Figure 7:
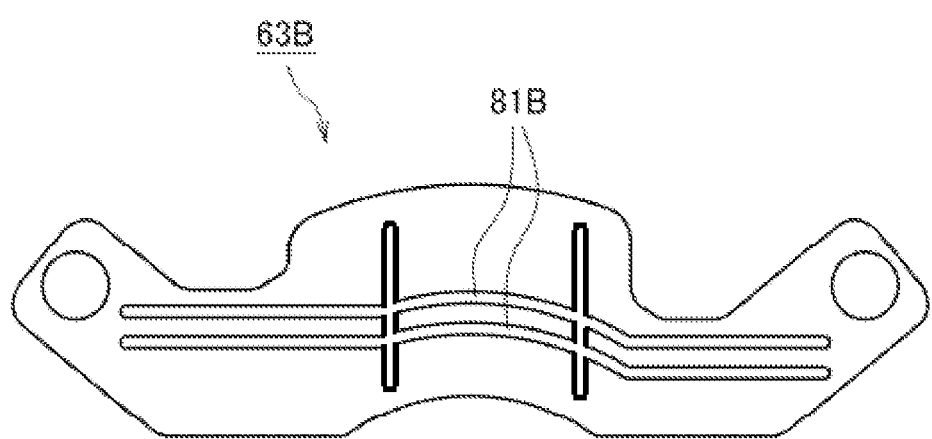
FIG. 7 is a top view of the magnetic member in accordance with a preferred embodiment of the present invention.

FIG. 6 is a top view of a magnetic member 63B related to a modified example of a preferred embodiment of the present invention. In the example shown in FIG. 6, two ribs 81B are preferably provided on the upper surface of the magnetic member 63B such that flexure of the magnetic member 63B can be further significantly reduced and prevented. In addition, the number of ribs which are provided at the magnetic member may also be 3 or more. Further, in order to further reduce and prevent flexure of the magnetic member, on the upper surface of the magnetic member, a plurality of ribs may also be arranged to extend while intersecting each other as shown in FIG. 7.

Further, the magnetic member in accordance with preferred embodiments of the present invention may also be formed of a magnetic body other than the, for example, electromagnetic steel plate. Further, the magnetic member in preferred embodiments of the present invention may also be formed by a working method other than the stamping-out, such as, for example, cutting.

Further, the magnetic member may also be fixed to the circuit board with use of three or more screws, for example. That is, the circuit board and the magnetic member may also be fixed to each other at three or more fixing positions, for example. Further, the circuit board and the magnetic member may also be fixed to each other by a fixing member other than the screw, if so desired. For example, it is also acceptable that a rivet is used as the fixing member and the magnetic member is interposed and fixed between the substrate and the rivet. Further, it is also acceptable that a portion of the magnetic member is swaged and engaged with the circuit board and the circuit board and the magnetic member are fixed to each other by an axial tightening force by swaging.

The number of Hall elements which are provided on the lower surface of the circuit board may also be four, as in the above-described preferred embodiment, may also be any of one to three, and may also be five or more. For example, three first Hall elements and two second Hall elements may also be provided on the lower surface of the circuit board. Further, a plurality of one type of Hall element may also be provided on the lower surface of the circuit board.

Further, the shape of the details of each member may also be different from the shape shown in each drawing of this application if so desired.

Further, the respective elements appeared in the above-described preferred embodiment or modified example may also be appropriately combined in a range in which inconsistency does not occur. Various preferred embodiments of the present invention can also be used in a motor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor comprising:
   a stationary section; and
   a rotating section that rotates around a central axis extending up and down, with respect to the stationary section; wherein
   the rotating section includes:
      a rotor magnet that generates torque between itself and an armature provided on a stationary section side; and
      a sensor magnet that is separate from the rotor magnet and includes a magnetic pole surface which faces the rotor magnet in an axial direction;
   the stationary section includes:
      a housing that accommodates the rotating section and the armature internally in a radial direction;
      a substrate disposed above the sensor magnet;
      a magnetic sensor arranged on a lower surface of the substrate to detect a magnitude of a magnetic flux of the sensor magnet; and
      a plate-shaped magnetic member disposed at a position axially overlapping the magnetic sensor on an upper surface of the substrate;
   the substrate and the magnetic member are fixed to each other at a plurality of axial fixing positions;
   the substrate is fixed to a surface perpendicular or substantially perpendicular to an axial direction of the housing;
   a rib extending so as to connect an area of one fixing position and an area of another fixing position is provided on an upper surface of the magnetic member;
   a concave portion is provided at a position corresponding to the rib in a lower surface of the magnetic member; and
   the magnetic sensor and the concave portion are disposed at positions which do not overlap each other in the axial direction.

2. The motor according to claim 1, wherein the sensor magnet is a ferrite magnet.

3. The motor according to claim 1, wherein the rib includes:
   a pair of linear portions extending linearly; and
   a curved portion extending in a curved line between the pair of linear portions; wherein axial overlap of the rib with the magnetic sensor is prevented by the curved portion.

4. The motor according to claim 1, wherein the magnetic member includes, at a peripheral portion of the lower surface thereof, a curved surface portion.

5. The motor according to claim 1, wherein the magnetic member is interposed and fixed between the substrate and a fixing member at one of the fixing positions.

6. The motor according to claim 5, wherein the magnetic member is screwed to a surface perpendicular or substantially perpendicular to the axial direction of the housing with the substrate interposed therebetween, at the one of the fixing positions.

7. The motor according to claim 1, wherein the magnetic member is made of an electromagnetic steel plate.

8. The motor according to claim 1, wherein a plurality of the ribs are provided on the upper surface of the magnetic member.

9. The motor according to claim 1, wherein the magnetic sensor includes a first magnetic sensor, and a second magnetic sensor disposed further radially outward of the first magnetic sensor; and the rib extends between the first magnetic sensor and the second magnetic sensor in plan view.

10. The motor according to claim 1, wherein a resin sheet is interposed between the substrate and the magnetic member at a peripheral portion of the fixing position.

* * * * *